United States Patent [19]

Gries

[11] 4,082,378

[45] Apr. 4, 1978

[54] DEFORMABLE BEARING SEAT

[75] Inventor: Donald A. Gries, Oregonia, Ohio

[73] Assignee: General Electric Company, Cincinnati, Ohio

[21] Appl. No.: 595,746

[22] Filed: Jul. 14, 1975

[51] Int. Cl.² ............................ F16C 35/04; F16C 35/06
[52] U.S. Cl. ............................................ 308/15; 308/24; 308/26
[58] Field of Search ............... 308/194, 26, 189 R, 308/189 A, 207 R, 184 R, 15, 24

[56] References Cited

U.S. PATENT DOCUMENTS

| 3,504,955 | 4/1970 | Bailey | 308/184 R |
|---|---|---|---|
| 3,897,983 | 8/1975 | Hindle | 308/26 |
| 3,967,866 | 7/1976 | Cohen | 308/184 R |

Primary Examiner—Richard A. Bertsch
Attorney, Agent, or Firm—Henry J. Policinski; Derek P. Lawrence

[57] ABSTRACT

A deformable bearing seat is provided for seating a bearing assembly in a housing. The seat includes a seating surface in the housing having a first predetermined contour when the housing is in an undeformed mode. The seating surface is deformable to a deformed contour when the housing is in a deformed mode. The seat is particularly adaptable for application to a rotating blade and mounting ring assembly in a gas turbine engine.

9 Claims, 5 Drawing Figures

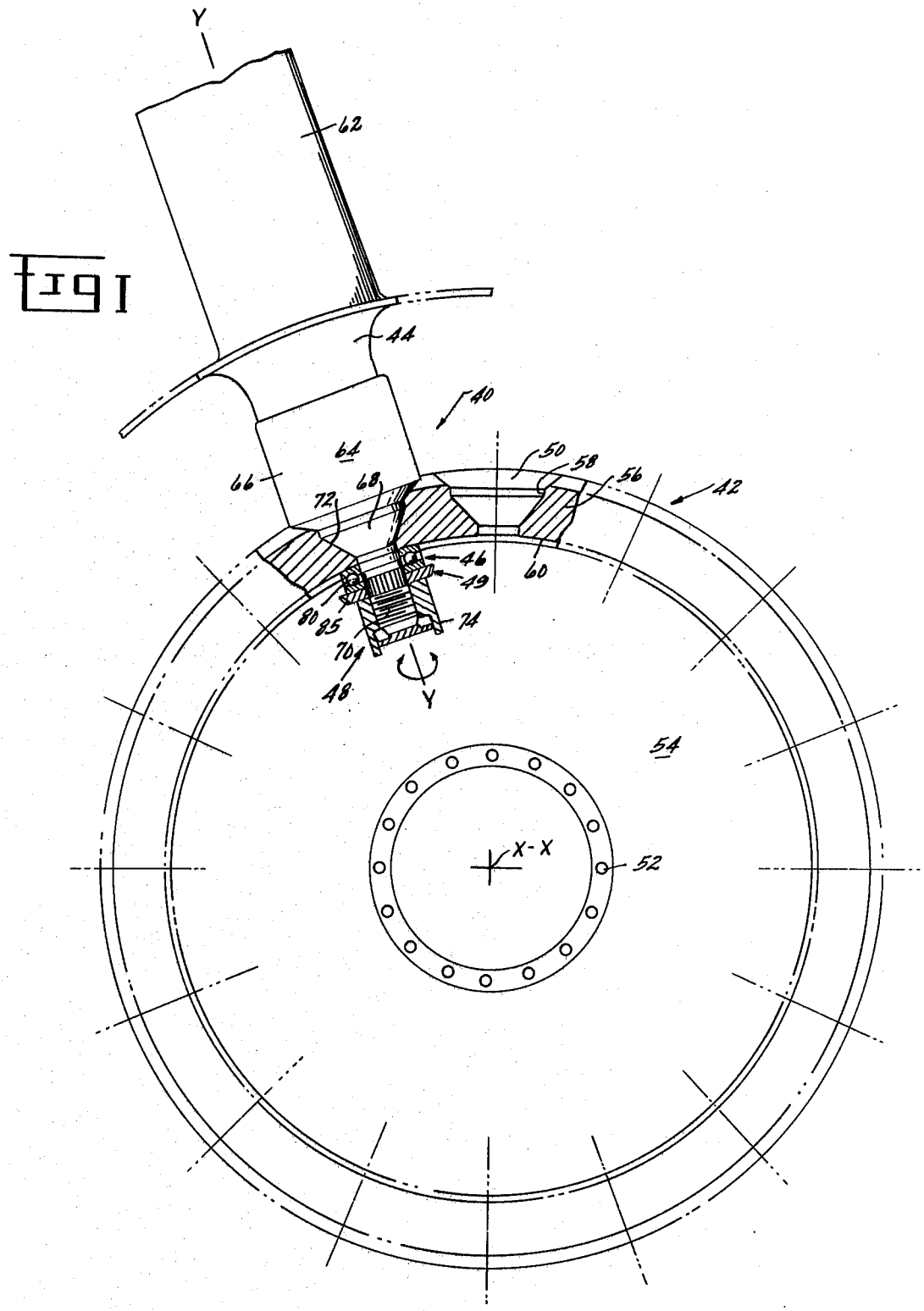

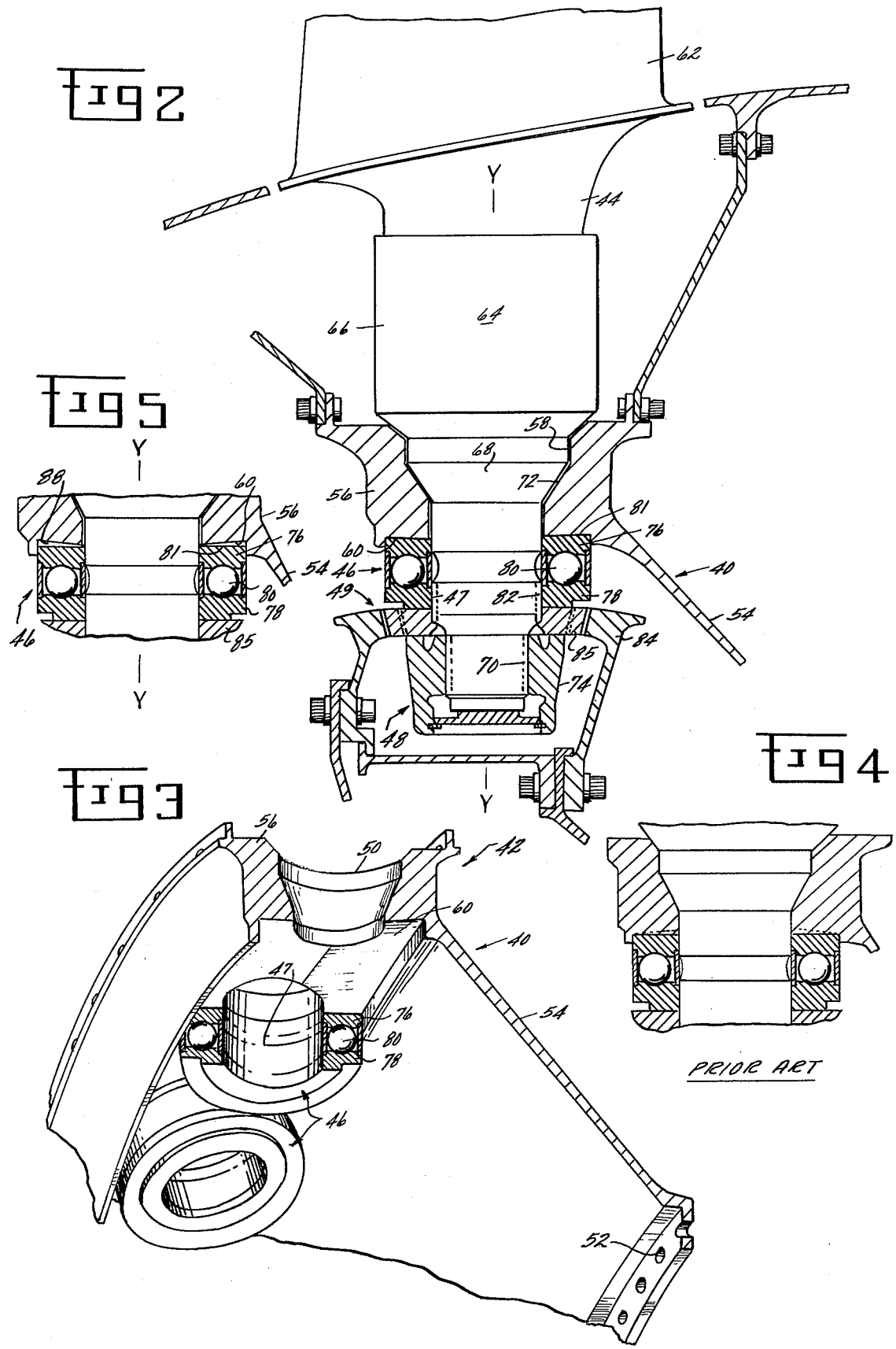

DEFORMABLE BEARING SEAT

BACKGROUND OF THE INVENTION

This invention relates to bearing support means and, more particularly, to bearing support means for variable pitch fan blades associated with gas turbine engines.

Power plants recently developed for large aircraft have included gas turbine engines wherein a power turbine associated with the core engine drives a large diameter fan which provides propulsive thrust for the aircraft. While in the past such fans have generally utilized fan blades having a fixed-pitch, more recently fan-type gas turbine engines have been provided with variable pitch fan blades to increase the operating efficiency of the engine over the entire range of the operating cycle.

In fan-type gas turbine engines, individual fan blades are secured to a disc attached to a shaft driven by a powered turbine such that both the disc and the fan blades rotate at high angular velocity about an axis comprising the centerline of the engine. In addition to the aforedescribed rotation, variable pitch fan blades are each rotatable about their own centerline to accommodate adjustments in blade pitch. Bearing assemblies and bearing seats used to support the fan blades for this latter rotation must be designed to function appropriately under high radial loads imposed by centrifugal forces associated with rotation about the engine centerline and yet must be compatible with weight and cost limitations of the engine.

Currently it is the practice of those skilled in the art to seat each individual bearing assembly in separate recesses machined into the fan disc. Since all radial loads due to the aforedescribed centrifugal force are ultimately transferred to the disc, deformation of the disc occurs causing distortion of the bearing seat such that, under operating conditions, the bearing assembly, since it is constrained to remain seated must also deform. Under operating conditions a deformed bearing assembly can result in excessive friction, heat generation, deterioration and premature failure of the bearing assembly. The present invention overcomes the aforestated problems associated with the current prior art practice by providing a substantially continuous seating surface which seats the bearing assembly in a manner designed to abrogate the adverse effects of disc deformation due to centrifugal forces under operating conditions.

SUMMARY OF THE INVENTION

Accordingly, it is an object of the present invention to provide new and improved variable pitch fan assembly for a fan-type gas turbine engine.

It is a further object of the present invention to provide a new and improved bearing assembly and bearing seat which may be readily adaptable to the operational environment associated with variable pitch fans in gas turbine engines.

Briefly stated, these and other objects of the present invention which will become apparent from the following detailed description and accompanying drawings are accomplished by the present invention which in one form provides a bearing seat for seating a bearing assembly in a housing wherein the seat comprises a deformable seating surface having a first predetermined contour for engaging the bearing assembly over a first contact area when the housing is in an undeformed mode. The seating surface is deformable to a deformed contour for engaging the bearing assembly over a second contact area when the housing is in a deformed mode. In the preferred embodiment of the invention, the deformed contour is identical to the contour of a surface on the outer race of the bearing assembly. As applied in a gas turbine engine the deformable bearing seat is deformable in response to centrifugal force acting upon the blade and ring assembly and is proportional to the level of rotational speed of the gas turbine engine. The invention may also be characterized by a variable gap between the seating surface and a race in the bearing assembly. The variable gap decreases as engine rotational speed increases until, at maximum rotational speed, the gap between the seating surface and the race is fully closed.

DESCRIPTION OF THE DRAWINGS

While the specification concludes with claims particularly pointing out and distinctly claiming the subject matter which is regarded as part of the present invention, the invention will be more fully understood from the following description of the preferred embodiments which are given by way of example with the accompanying drawings in which:

FIG. 1 is a front schematic view of the fan disc in the deformed mode with one fan blade shown in its mounting environment in the disc flange and the position of the other fan blades indicated by centerlines;

FIG. 2 is a side view depicting a fan disc in the deformed mode with a rotatable fan blade mounted therein in accordance with the present invention;

FIG. 3 is a perspective view of a segment of the fan disc depicting the bearing assemblies and the bearing seat arrangement of the present invention;

FIG. 4 is an isolated view of a fan disc with a fan blade mounted therein in accordance with the present state of the art; and FIG. 5 is an isolated view of a fan disc in the undeformed mode with a rotatable fan blade mounted therein in accordance with the present invention.

DESCRIPTION OF THE PREFERRED EMBODIMENT

Referring to the drawings it is readily apparent that typical assemblies and subassemblies of a gas turbine engine are not shown therein. It is generally well known in the art that a typical gas turbine front fan engine is comprised of a fan assembly positioned forward of a core engine, the latter including in serial flow relationship a compressor, a combustor, a high pressure turbine adapted to drive the compressor, a low pressure turbine adapted to drive the fan assembly, and a core engine nozzle. Air ingested into the compressor is compressed and discharged into a combustor wherein the air is mixed with fuel and burned. The high energy hot gases produced by burning the mixture emerge from the combustor and are directed through the high pressure turbine wherein energy is extracted to drive the compressor. The lower energy combustion gases are then directed through a low pressure turbine wherein additional energy is extracted to drive the fan assembly which operates to effect a propulsive force to power the aircraft. The hot gases are finally discharged through the core engine nozzle to provide an additional propulsive force.

While the present invention is well adapted for cooperation with the core engine described above, it is capable of application to any multibladed engine which might differ in some manner from the aforedescribed typical gas turbine engine. Directing attention to FIG. 1 a fan blade and disc assembly is shown generally at 40 with its constituent parts cooperating under operating conditions and is comprised of fan disc or housing 42, a plurality of fan blades 44 (only one of which is shown with the position of the others indicated by centerlines), a plurality of bearing assembly 46, a plurality of blade retaining means 48 and a plurality of pinion gears 49. Each fan blade 44 is associated with one of a plurality of radially extending apertures 50 in fan disc 42 and is supported for rotation therein in a manner hereinafter to be described. Fan disc or housing 42 is secured to a drive shaft (not shown) by conventional means cooperating with mounting holes 52 whereby fan disc 42 is rotatably driven about a first axis X—X to provide propulsive power.

Fan disc or housing 42 has a conically shaped hub portion 54 with an axially and circumferentially extending annular mounting ring or flange 56 integrally connected thereto (both better observed in FIG. 3). While a fan disc is shown in FIG. 3, other means, such as a cylindrical drum, can be used as a carrier for fan blades 44 and the present invention is equally adaptable to such alternate structure. The aforementioned apertures 50 are disposed in flange 56 at equally spaced circumferential intervals. Each aperture 50 is shown to be comprised of a series of consecutively stepped diameter portions 58 arranged such that the diameter of the aperture 50 decreases in the radially inwardly direction. Flange 56 includes a radially inwardly facing, circumferentially and axially extending seating surface 60 upon which each individual bearing assembly associated with each fan blade 44 is seated. Seating surface 60 is substantially continuous around the inner periphery of flange 56, the only interruptions therein being apertures 50.

Each fan blade 44 incorporates an airfoil 62 with a shank 64 adapted to penetrate into and through one of the apertures 50 in fan disc 42. The shank 64 includes an enlarged generally cylindrical portion 66 and a smaller generally cylindrical portion 68. Threads 70 are formed in cylindrical portion 68 near its radial innermost end for purposes hereinafter to be described. Between enlarged cylindrical portion 66 and threads 70, cylindrical portion 68 is comprised of a series of stepped diameter segments 72 arranged such that diameter of cylindrical portion 68 decreases in the radially inwardly direction. Segments 72 are adapted to matingly engage stepped diameter portions 58 of aperture 50 thereby effecting support of blade 44 on fan disc 42.

Referring now to FIG. 2, which shows a blade and disc assembly with its constituent parts cooperating under operating conditions, fan blades 44 each extend into and through one of the plurality of apertures 50 such that enlarged cylindrical portion 66 is disposed radially outward of flange 56 and part of smaller cylindrical portion 68 is disposed radially inward of flange 56. Radially inwardly of flange 56, cylindrical portion 68 cooperates with bearing assembly 46, pinion gear 49 and nut 74 in such a manner so as to provide for retention of blade 44 in aperture 50 and rotation of blade 44 in aperture 50 during adjustments in pitch of airfoil 62. More specifically, bearing assembly 46, comprised of an annular radially outer race 76, an annular radially inner race 78 and bearing elements 80, circumscribes and engages cylindrical portion 68 of shank 64 which is received in a centrally located aperture 47 which extends through bearing assembly 46 and is co-axial with the Y—Y axis. Outer race 76 fits loosely around cylindrical portion 68 and has a radially outwardly facing surface 81 which is seated on seat surface 60 of flange 56. Inner race 78 and pinion gear 49 are each secured to cylindrical portion 68 by conventional splined attachment as shown at 82 such that while each is free to slide axially along cylindrical surface 68 in the direction of the Y—Y axis, each is constrained to rotate in unison with fan blade 44 about the Y—Y axis. Nut 74 is threaded onto threads 70 of cylindrical portion 68 and tightened until bearing assembly 46 and pinion gear 49 are securely trapped between nut 44 and surface 60. In this position surface 81 of bearing assembly 46 is held seated on surface 60 and stepped diameter segments 72 are held in engagement with stepped diameter portions 58 of aperture 50. Drive gear assembly 84 engages pinion gear 49 in a conventional manner at 85 to effect rotation of pinion gear 49, inner race 78 and blade 44 about the Y—Y axis to achieve adjustments in pitch of airfoil 62.

As best observed in FIGS. 1 and 3, seat surface 60 extends 360 degrees around the inner periphery of flange 56. Seat surface 60 is adapted to engage each radially outwardly facing surface 81 on each outward bearing race 76 of bearing assemblies 46. Hence, one substantially continuous seat 60 extending 360 degrees around the inner periphery of flange 56 is provided which seats the plurality of bearing assemblies 46.

FIG. 4 depicts a bearing and bearing seat assembly in accordance with the present state-of-the-art practice. Under operating conditions, that is when the gas turbine engine is providing thrust for the aircraft and the blade and disc assembly are rotating at high angular velocities, the blade is subjected to a centrifugal force acting in the radially outward direction as indicated by the arrow in FIG. 4. The centrifugal force is transferred from the blade throuugh the bearing assembly to the disc causing the disc to deform as indicated by the broken lines in FIG. 4. It is readily apparent that deformation of the disc causes deformation of the disc seating surface, and since the bearing race and seating surface remain matingly engaged, the bearing assembly is likewise distorted. Distortion of the bearing assembly causes the bearing loads to be absorbed by the bearing in an abnormal manner; that is in a manner for which they were not designed. Hence, bearing assembly distortion results in excessive friction, heat generation, deterioration and premature failure of the bearing assembly.

The present invention overcomes the aforestated deficiencies of the prior art devices by providing a bearing seat which accommodatesdeformation of the disc and yet does not result in deformation of the bearing assembly.

Referring to FIG. 5, an isolated view of the flange 56 of disc 42, reduced diameter portion 68 of a blade shank 64 and bearing assembly 46 are depicted so as to show the cooperation of those elements when the disc 42 is in an undeformed mode; that is, when the gas turbine engine is not in thrust producing operation. More specifically, seating surface 60 is machined to a first contour such that when mated with bearing assembly 46, an annular gap 88 is produced between seating surface 60 and radially outwardly facing surface 81 on outer race 76.

The height of annular gap 88 decreases in a direction toward the Y—Y axis until eventually the seating surface 60 engages surface 81 of outer race 76 over a first contact area in near proximity to centrally located aperture 47. Cooperating in this manner, bearing assembly 46 is only partially seated on seating surface 60 since only a portion of surface 81 of outer race 76 is in engagement with seating surface 60. As stated above, during thrust generating operation of the gas turbine engine centrifugal force imposed on blade 44 is transmitted through bearing assembly 46 to flange 56 of disc 42. The magnitude of centrifugal force varies across the range of rotational speed capability of the gas turbine engine with the magnitude of centrifugal force increasing as engine rotational speed increases.

In the present invention, flange 56 and seating surface 60 pass into a deformed mode in response to the aforedescribed centrifugal force and associated rotational speed of the gas turbine engine. In this mode, seating surface 60 deforms to a deformed contour such that the engagement or contact area between seating surface 60 and surface 81 of race 76 is increased and gap 88 is reduced. The amount of deformation exhibited by surface 60 and the contact area between seating surface 60 and race surface 81 are responsive to the magnitude of centrifugal force and hence to the rotational speed of the gas turbine engine. As the rotational speed of the engine increases, surface 60 undergoes increasing deformation resulting in engagement with surface 81 over an increased contact area until, at maximum rated engine rotational speed, surface 60 has a deformed contour as indicated by dashed lines 90 in FIG. 5 which is identical to the contour of surface 81. At maximum rated rotational speed, since both contours are identical, surface 81 of outer race 76 is in full mating engagement with seating surface 60 and gap 88 is completely closed. Such full engagement is as shown in FIGS. 1 and 2.

Hence, deformation of flange 56 and seating surface 60 results in full seating of bearing assembly 46 at maximum rotational speed conditions. Whereas in prior art devices the bearing assembly must deform in order to remain fully seated on the disc seating surface at high engine speed output, the seating arrangement of the present invention permits full seating of bearing assembly 76 without attendant bearing assembly deformation or abnormal bearing loads. Furthermore, in the present invention, while bearing assembly 46 is only partially seated at intermediate speed levels it remains undeformed and absorbs bearing loads in a normal and acceptable manner.

While preferred embodiments of the present invention have been disclosed herein, those skilled in the art will appreciate that other forms of the invention are possible without departing from the scope of the invention as defined by the appended claims.

I claim:

1. A deformable bearing seat for seating a bearing assembly in a housing said seat comprising:
   a deformable seating surface in said housing having a first predetermined contour adapted to engage said bearing assembly over a first contact area when said housing is in an undeformed mode, said seating surface being deformable from said first predetermined contour to a deformed contour adapted to engage said bearing assembly over a second contact area when said housing is in a deformed mode.

2. A bearing seat as set forth in claim 1 wherein said second contact area includes said first contact area and is greater than said first contact area.

3. In a thrust generating gas turbine engine having a blade and ring assembly mounted for rotation about a first axis, said assembly including a plurality of blades each rotatably secured to said ring for rotation about a second axis, a plurality of bearing assemblies each disposed adjacent one of said blades, means for securing said plurality of blades to said ring the combination comprising:
   a deformable seating surface associated with one of said of bearing assemblies, said seating surface having a first predetermined contour when said ring is in an undeformed mode; and
   a bearing race in at least one of said bearing assemblies, said race having a first surface engaging said deformable seating surface, said seating surface in engagement with said first surface over a first contact area when said ring is in said undeformed mode, said seating surface deformable from said first predetermined contour to a deformed contour when said ring is in a deformed mode, said seating surface in engagement with said first surface over a second contact area when said ring is in said deformed mode.

4. The invention as set forth in claim 3 wherein said deformable seating surface is deformable from said first predetermined contour to said deformed contour in response to centrifugal forces acting upon said blade and ring assembly.

5. The invention as set forth in claim 3 wherein said second contact area is responsive to the level of rotational speed of said thrust generating gas turbine engine.

6. The invention as set forth in claim 3 wherein said deformed contour is identical to a contour of said first surface on said bearing race.

7. The invention as set forth in claim 3 further comprising:
   a variable gap between said first surface and said seating surface, said gap being variable in response to centrifugal forces acting upon said blade and ring assembly.

8. The invention as set forth in claim 7 wherein said variable gap decreases in response to increasing rotational speed of said thrust generating engine.

9. The invention as set forth in claim 8 wherein said gap is fully closed when said thrust generating engine is at maximum rotational speed.

* * * * *